Oct. 29, 1963     I. MAYER     3,109,042

OLEFIN CONTROL IN ISOPARAFFIN ALKYLATION

Filed June 8, 1962     3 Sheets-Sheet 1

Ivan Mayer
Inventor

By Perry Carvellas Attorney

Ivan Mayer  Inventor

By Perry Carwell Attorney

Oct. 29, 1963     I. MAYER     3,109,042
OLEFIN CONTROL IN ISOPARAFFIN ALKYLATION
Filed June 8, 1962     3 Sheets-Sheet 3

FIG.-8

Ivan Mayer     Inventor

By Perry Carvella Attorney

3,109,042
OLEFIN CONTROL IN ISOPARAFFIN ALKYLATION
Ivan Mayer, Summit, N.J., assignor to Esso Research and Engineering Company, a corporation of Delaware
Filed June 8, 1962, Ser. No. 200,982
22 Claims. (Cl. 260—683.58)

This invention concerns improvements in alkylation processes for the synthesis of branched chain hydrocarbons by the reaction of isoparaffinic hydrocarbons with olefins in the presence of liquid catalysts. Branched chain aliphatic hydrocarbons are important and desirable constituents of automotive and aviation fuels because of their high octane ratings. The invention is particularly directed to improvements in emulsion alkylation reactions wherein an olefin is introduced into an agitated emulsion of isoparaffinic hydrocarbon and liquid acid catalyst to effect the desired alkylation reaction while minimizing undesired side reactions and catalyst degradation and thereby maximizing product yield and quality. More particularly, the invention provides methods and means whereby vaporization of the olefin feed stream is prevented and the disadvantages attending such vaporization are avoided. This invention also relates to an improved method of preventing corrosion and plugging of olefin inlet means in the reactor.

In the alkylation of isoparaffinic hydrocarbons with olefin hydrocarbons in the presence of liquid acid catalysts, such as sulfuric acid, a particular problem that arises is that of preventing or minimizing the polymerization of the olefins or their degradation into sludge by contact with the alkylation catalyst. A desirable way to solve this problem is to effect the catalytic alkylation reaction under conditions that are designed to avoid, as much as possible, intimate contact of the olefins with the catalyst material in the comparative absence of isoparaffins. This may be accomplished by providing a substantial excess of isoparaffins in the reaction zone and by introducing the olefinic material into a well agitated emulsion of isoparaffin alkylation catalysts and reaction products. Even with these precautions, however, it is difficult to eliminate completely the polymerization of olefins or the formation of less desirable alkylation products in an emulsion alkylation process.

To obtain the high degree of mixing of olefins necessary to obtain high quality alkylate and prevent polymerization of the olefins and degradation to undesirable products, it is necessary to inject the olefin feed into the acid emulsion in very narrow diameter streams and at high velocities. Heretofore, injecting the olefins into the reactors through simple orifice openings at low velocities resulted in corrosion and failure of the olefin inlet means due to acid run-back into the openings. It was unexpectedly found that if the olefin was injected into the reaction zone through narrow diameter jet nozzles at high velocities, the acid corrosion of the olefin inlet was overcome. However, these narrow diameter nozzles under certain operating conditions were subjected to deposition of solid material in the nozzle and nozzle plugging resulted. By carrying the process of the present invention of injecting the olefin feed into the reaction zone through olefin jet nozzles of critical diameter and length and at critical velocities, both the corrosion and plugging problems are solved while, at the same time, maximum mixing efficiency of olefin and isoparaffin are obtained and alkylate product of consistent high quality is obtained.

In order to obtain maximum mixing efficiency to minimize production of undesirable by-products and obtain high quality alkylate, it is necessary to introduce the olefin feed into the agitated emulsion of isoparaffin and liquid acid catalyst in the form of jet streams at high velocities of the order of at least 50 feet per second, and preferably of at least 60 feet per second and having diameters as small as practicable; i.e., no more than about 0.05 inch and, preferably, no more than about 0.035 inch.

While the procedures just described have resulted in considerable improvement in alkylate quality, and have overcome to a great degree the corrosion problem, it has more recently been discovered that difficulty often arises with a tendency for the olefin injection nozzles to plug, particularly when high velocities are employed. It has now been found that this plugging arises from the formation of ice within the nozzles and the deposition of ice and/or the deposition of small solid particles on the walls of the nozzle bore. The ice can result even if only trace amounts of water are present in the feed. Experiments have shown that, with high velocity jets, vaporization of the liquid olefin feed tends to occur just downstream from the jet inlet, causing local autorefrigeration which, in some instances, cools the feed to extremely low temperatures of the order of 200 to 300° F. below zero. This causes the formation of the ice crystals and the deposition of any small particles of material suspended in the feed, which deposits in layers within the bore of the nozzle; thus, merely subcooling the olefin feed below its bubble point at the reactor pressure, is not sufficient to prevent vaporization within the injection nozzles, although it does prevent vaporization in the jet header. An analysis of the pressure gradients through jets operating at relatively high velocities shows that, if the straight run portion of the jet is not sufficiently long, or if the entrance loss is too high, the pressure in the vena contracta following the entrance can become substantially lower than the pressure in the reactor vessel. This not only leads to precipitation of water and solid material within the injection nozzles, but also increases the pressure drop substantially above the calculated value for liquid alone flowing through the nozzles.

It is an object of the present invention to improve the emulsion alkylation process so as to reduce undesired side reactions to a minimum and thereby increase the quality of the alkylate produced. It is a further object of this invention to prevent or minimize corrosion of the olefin inlet means. It is still another object of this invention to provide a method of olefin feed injection that will prevent abnormally high pressure drops and vaporization of the olefin feed and thereby avoid the plugging problem.

In accordance with the present invention, it has been found that the vaporization of the olefin feed at high velocities through small diameter injection nozzles can be prevented, where the feed is cooled to a temperature below its bubble point temperature at reactor pressure, by employing injection nozzles that have internal bores of sufficient length to provide a pressure drop which is equivalent to at least 1.28 velocity heads, where the velocity head is determined from the expression $V^2/2g$, in which V is the fluid velocity in feet per second and $g$ is the gravitational constant, 32.2. The expression $V^2/2g$, is well understood by those familiar with fluid mechanics. Operating in this manner prevents vaporization at any point within the feed system.

In accordance with the present invention, the olefins are introduced into the agitated emulsion of isoparaffin and liquid acid catalyst in the form of a jet stream having a velocity higher than a critical minimum and a diameter less than a critical maximum. Additionally, the temperature of the olefin feed is kept below a critical maximum and, at the same time, the olefins in the feed are diluted to less than a critical maximum concentration. These steps ensure that the time during which there is a relatively high concentration of olefin to the acid will be reduced to a bare minimum, which prevents polymerization of the olefin feed and the formation of sludge.

The nature of the invention and the improvements afforded by the practice thereof will be more clearly understood with reference to the accompanying drawing in which.

Figure 1:
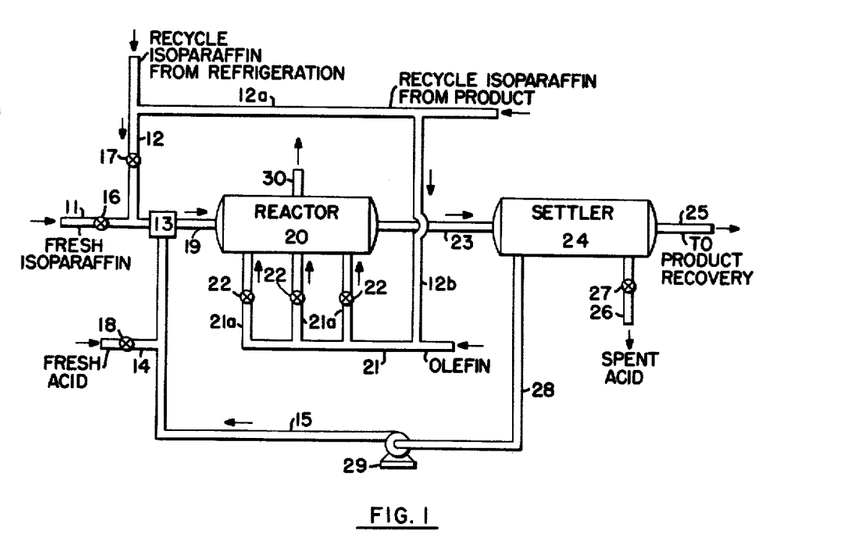
FIGURE 1 is a diagrammatic presentation of a suitable arrangement of apparatus for conducting an alkylation reaction in accordance with the present invention.

The invention will be particularly described with reference to the alkylation of isobutane with butylene in the presence of concentrated sulfuric acid as catalyst. It is not intended, however, that the invention be limited to this particular alkylation reaction as the same principles can likewise be applied to related reactions using other isoparaffins, such as isopentane and isohexane, and other olefins, such as ethylene, propylene, butenes, amylenes or hexenes, and other fluid catalysts. Referring now to FIGURE 1 in detail, the general features of the alkylation process may be understood.

A reaction vessel 20 is employed which may be of such size as is required by the volume of the material to be handled and by the residence time required for effecting the alkylation reaction. Means are provided for introducing the reacting materials into the vessel and for removing reaction products therefrom. It is preferred for proper control of the reaction that the acid and at least part of the total isoparaffin be mixed before entering the reactor. Thus, an isobutane feed made up of fresh isobutane entering through line 11 and recycle isobutane entering through line 12 is conducted to a mixing zone 13 where it is mixed with sulfuric acid catalyst. A portion of the recycle isobutane is obtained via line 12a from a product recovery system, which is not shown in the figure. The sulfuric acid catalyst enters the mixing zone through fresh acid line 14 and recycle acid line 15. Once the operation has been started, a major supply of acid will be recycle acid from the product settler with small amounts of acid being added through line 14 as needed. The feed rates of fresh isobutane and fresh acid are controlled by valves 16, 17 and 18, respectively.

The mixture of acid and isoparaffin that is prepared in mixing zone 13 is conducted through line 19 into reactor 20 to which an olefin; e.g., butylene, is fed, preferably as a plurality of streams by means of line 21 through line 21a. The rate of feed is controlled by valves 22. As explained in a later portion of the specification, the olefin stream is diluted with isoparaffin; e.g., isobutane, so that a maximum of about 10 percent olefins are present in the olefin containing feed stream. Suitably, the diluent can be recycle isobutane from the product fractionation system, obtained via line 12b. The mixture of acid, isoparaffin and olefin is maintained as a well-mixed emulsion in reactor 20 by any suitable means, as for example by a mechanical stirrer and appropriate baffles, by recirculation of the emulsion at high turbulence, or by other means known to the art. Suitable provision is made to maintain the reaction temperature in the reactor at the desired level, preferably at 40° to 60° F.

Preferably the reaction temperature is maintained at the desired level by autorefrigeration. To accomplish this, overhead vapors from the reactor 20 are carried through line 30 to a refrigeration system (not shown). The isobutane recovered from this system makes up the balance of the recycle isobutane entering the reactor through line 12.

A portion of the emulsion is continuously withdrawn from reactor 20 through line 23 and sent to the product settler 24 where separation between hydrocarbons and acid catalyst takes place. Spent acid catalyst from the product settler is discarded through line 26, controlled by valve 27, while recycle acid is removed from the settler by line 28 and returned by means of pump 29 through the recycle line 15 to the mixing zone 13 as previously described.

The reaction product leaves the settler through line 25 and is sent through the conventional caustic and water-wash steps and a subsequent fractionation step. Isoparaffin recovered from the product is sent back to the reactor through line 12a as previously described.

In FIGURES 2 to 5 inclusive are shown details of one design of a stirred reactor for effecting the alkylation reaction of this invention. This design provides for succesive stages or zones within the reactor, with each stage being isolated by appropriate baffles and with stirring means in each stage or zone. Olefin feed is introduced separately into each of the zones. Considering now FIGURES 2 and 3 in detail, reactor 20 comprises a horizontal cylindrical vessel having an inlet 31 through which the mixture of acid catalyst and isoparaffin enters the reactor, and a plurality of vertical baffles 32a, 32b, etc., which divide the reactor into separate reaction zones 37a, 37b, and so on. It is preferred that each reactor have ten to twenty of such zones in series, although only two complete zones are shown.

Figure 2:
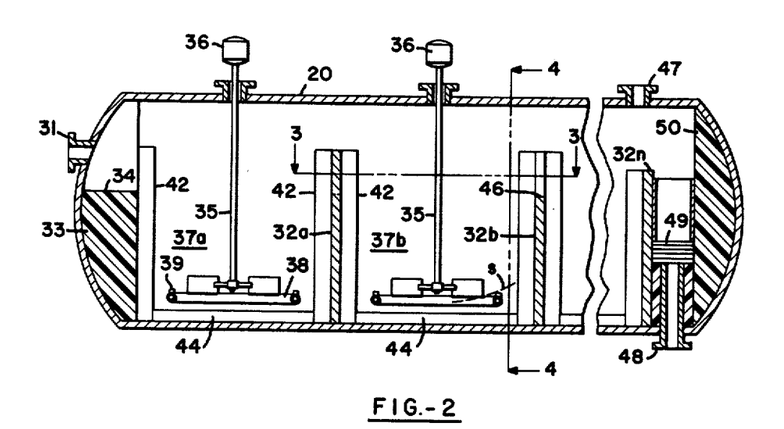
FIGURE 2 is a sectional side elevational view of a portion of one form of stirred reactor useful for practicing this invention.
Figure 3:
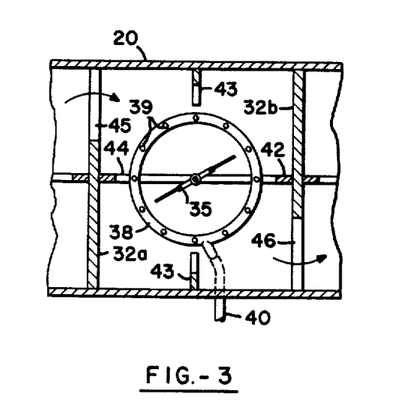
FIGURE 3 is a broken sectional plan view taken on line 3—3 of FIGURE 2.

A quantity of fill material 33 occupies the inlet end of the vessel to provide a vertical wall for the inlet end of the first reaction zone. Conveniently, this fill material may comprise a phenolic resin containing carbon particles. A flat surface 34 is provided above the fill material adjacent the inlet 31 to serve as a flash pan for removal of vapors from the entering mixture and thus minimize mixer impeller cavitation during the stirring of the emulsion. As much as 60 percent of the vapors accumulating in the reactor may originate on or in the vicinity of the flash pan.

The reaction mixture in each of the zones is kept agitated by a flat bladed stirrer 35 driven by a motor 36. A stream of olefin feed is injected into each of the reaction zones through a ring 38 about which are distributed a plurality of jet nozzles 39, the ring being centrally positioned adjacent the stirrer 35. The olefin feed enters the distributing ring through inlet pipe 40. As discussed at greater length later in the specification, the orifice nozzles are of small internal diameter so as to eject the olefin streams at exceedingly high velocities. For various mechanical reasons, the nozzles are preferably directed upward from the distribution ring as shown.

For most efficient operation, it would be desirable to position the discharge tips of the nozzles at the center of the discharge path of the stirrer blades, as this corresponds to the point of maximum discharge velocity. However, to avoid mechanical difficulties that would arise if excessive whip of the shafts of the stirrers should occur, it is preferred to position the nozzles so that they are just below the line of swing of the blades as shown by the dotted lines in FIGURE 2. This permits the olefin feed to discharge at the flow boundary of maximum shear of the stirred emulsion while, at the same time, avoiding collision of the stirrer blades with the nozzles.

By using properly sized jet nozzles instead of simple orifices in the distribution ring itself and by introducing the olefin feed at the proper velocities, acid is prevented from flowing countercurrent to the olefin feed into the distribution ring. The back flow of acid causes corrosion and failure of the orifice and feed header. The jet nozzles of this invention are preferably constructed of an alloy, such as Hastelloy B or tungsten carbide. It is preferred that these nozzles be welded in place, as shown, rather than to use threaded connections and gasket, or the like. Preferred designs of nozzles are shown in sectional view in FIGURES 5, 6, and 7. It will be noted that the outlet tips of the nozzles can be tapered to wall thicknesses approaching the thickness of a knife edge so as to eliminate stagnant pockets of acid that could contain high concentrations of olefin near the jet discharge. The effective length of the drilled bore of the nozzle can be at least twenty times the diameter of the drilled bore, preferably a minimum length of one inch.

As shown more clearly in FIGURE 3, auxiliary vertical baffles 42 and 43 are positioned within each of the reaction zones. Also a central ridge baffle 44 is placed on the bottom of each zone. These auxiliary baffles ensure that there will be highly efficient mixing of the olefin with the isoparaffin and acid catalyst.

As additional isoparaffin and acid catalyst enter the reactor inlet, the reaction mixture will flow from zone to zone toward the emulsion outlet 48. By providing separate zones or stages, and by introducing the olefin separately into each well agitated zone, the danger that excess olefin will be present at any time is substantially eliminated, thereby preventing the undesirable side reactions of olefin polymerization and sludge formation, which if not prevented will increase the catalyst consumption.

A vapor outlet 47 is provided at the top of the reactor so that volatile hydrocarbons may be removed overhead to regulate the reaction temperature by autorefrigeration.

Figure 4:
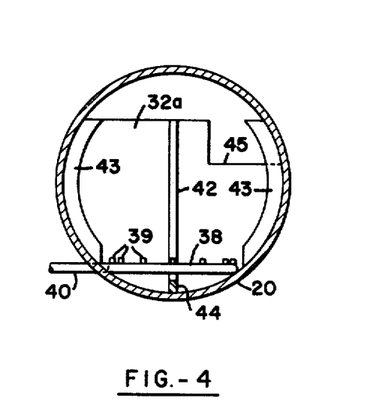
FIGURE 4 is a sectional elevation taken on line 4—4 of FIGURE 2.
Figure 5:
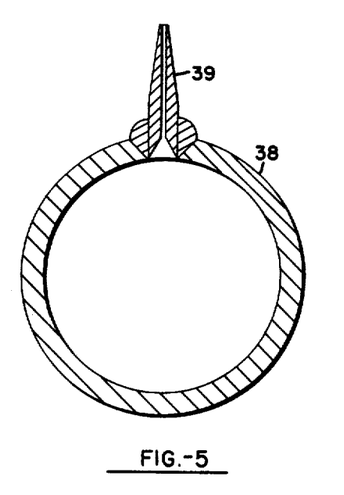
FIGURE 5 is a sectional view of one form of nozzle and feed header that are particularly desirable for providing the olefin jet streams of this invention.

The top edge of each of the vertical baffles 32, except the final one, is stepped down on one side so that flow from one reaction zone to the next takes place on only one side of the baffle. Also, the steps on successive baffles alternate from side to side. Thus baffle 32a has a step 45 on the right-hand side as shown in FIGURE 4, and baffles 32b have a step 46 on the left-hand side. As shown by the arrows in FIGURE 3, this causes the emulsion to take a tortuous path through the reactor, thus minimizing any tendency for the emulsion to bypass any of the zones. Such baffles are referred to as side flow baffles. The final baffle 32n does not have a stepped-down edge but is at the same height across its entire top edge. The height of the latter baffles controls the height of the liquid level in the reactor.

The outlet end of the reactor is partially filled in with material 59 of a similar nature to that of fill material 33 at the inlet end. This reduces the volume of the space between the last baffle 32n and the end of the vessel, thus minimizing the holdup time in this region and preventing undesirable side reactions which tend to occur in poorly mixed zones. The outlet chamber thus formed has a sloping bottom, as shown, to direct the emulsion to the outlet 48, a conventional type of anti-vortex baffle 49 being provided at the top of the outlet.

In a representative alkylation reaction wherein butylenes are alkylated with isobutane in the presence of sulfuric acid of 90 to 95% strength to produce about 10,000 barrels per stream day (b./s.d.) of alkylate, about 5700 b./s.d. of olefins and about 6700 b./s.d. of fresh isobutane will be consumed. As it is preferred to maintain a substantial molar excess of isoparaffin to the olefin in the alkylation reaction, considerable isobutane from the reaction product is recycled to the reactor so that the reactor actually handles about 14,000 b./s.d. of isobutane. Likewise, although the above quantities of hydrocarbon materials may require about 84 tons of fresh 98% sulfuric acid per stream day, the actual amount of acid flowing through the system per day will be much greater since the ratio of recycle acid to fresh acid may be of the order of 200 to 1 or more.

In an emulsion type alkylation reaction, it is normally desirable to operate the proces with a very high proportion of acid in the reaction zone. Tests have shown that in order to ensure stability of hydrocarbon-acid emulsions, the acid phase should make up at least half of the emulsion volume. Additional tests have shown that it is quite difficult to obtain homogeneous emulsions at reasonable power inputs in mixing zones containing less than about 60% acid. Thus, in order to assure smooth and efficient operation, the acid catalyst in the emulsion alkylation reactor should preferably make up 60 to 70 percent of the volume of the emulsion of acid and hydrocarbon.

By employing a plurality of reactors 20 in series, it is possible to control reaction temperatures very effectively by autorefrigeration, thus maintaining substantially the same reaction temperature throughout the series by adjustment of the pressure in each reactor to control the amount of hydrocarbons removed overhead. As a typical example, a reaction temperature of 40° F. ±3° F. may be maintained in each of four reactors in series by keeping the pressures at about 26, 24, 21 and 18 p.s.i.a., respectively.

It has been well established that a typical jet stream of fluid entering into another body of fluid induces into the stream a volume of the other fluid equal to its own volume at a distance equal to from 5 to 8 times the diameter of the jet. Thus, a jet of olefins entering a body of hydrocarbons and acid catalyst will induce only a relatively small volume of acid into that zone of 5 to 8 diameters from the point of entry of the jet. In a process in which the emulsion comprises 60% acid and 40% hydrocarbon, a stream of olefins of 40% concentration jetted into the emulsion will pick up acid of the order of one volume of acid for each 0.6 volume of olefin by the time the feed has traveled a distance of 5 to 8 jet nozzle diameters. This compares with the normally desired ratio of about 1000 volumes of acid for each volume of olefin. In the case of alkylation of isobutane with butylene, wherein the desired end products are trimethylpentanes, and where the high ratio of olefin to olefin to acid mentioned above exists in the jet stream, about 95% of the olefin converted in this critical zone will end up as products of about 87 to 88 motor octane number ("bad alkylate") instead of the 96 to 99 octane number of the product desired, and there will be a selectivity to trimethylpentanes of only about 1%. The remaining 4% of the converted material will end up in the catalyst as sludge.

To minimize the undesired reactions occurring at the point of entry of the olefins into the emulsion of hydrocarbon and acid, the present invention reduces the time during which the relatively high concentration of olefin to acid exists. This is accomplished by reducing the olefin jet diameter to less than a critical maximum and by increasing the jet velocity to greater than a critical minimum.

The effects of increasing the jet velocity and of decreasing the jet diameter in accordance with the present invention will be appreciated from the information presented in the accompanying Tables I, II and III. With other conditions being constant, increasing the jet velocity will decrease the amount of olefin converted to undesired products in the critical zone, which has heretofore been defined as the length of the jet equal to about 8 jet diameters. The effect of varying the jet velocity at a constant jet diameter is shown in Table I. These data were calculated on the basis of the use of 96% strength sulfuric acid with 60% acid and 40% hydrocarbon in the emulsion, 60% isobutane in the reaction product and 40% olefins in the feed and 45° F. average jet temperature. A nozzle diameter of 0.05 inch was assumed for the olefin jet. To simplify the calculations, it is assumed that the induced acid will have completely mixed with the olefin by the time the jet has traveled 8 diameters and the average olefin concentration up to 8 diameters is the same as the olefin concentration at the 8 diameter distance. The olefin conversion values presented in Tables I, II and III refer to the conversion to undesired products during the time required to travel the first 8 diameters. This is conservative, as the overall conversion to undesired products could easily be two to eight times that amount, if the calculations are integrated back to the base of the jet, and likewise extended out to a point where the olefin-to-acid ratio is not undesirably high. It was also calculated that the undesired products to which the olefins are converted consist of 94.5 percent "bad alkylate," and only 0.7 percent of the desired trimethylpentane, the balance being acid diluent.

TABLE I

*Effect of Jet Velocity at Constant Jet Diameter*

[Diameter 0.05 inch]

| Jet Velocity, Ft./Sec. | 3.75 | 7.5 | 15 | 30 | 60 | 120 |
|---|---|---|---|---|---|---|
| Percent of Olefins Converted to Undesired Products | 4.78 | 2.38 | 1.20 | 0.597 | .298 | .149 |

Assuming a constant volume of flow per jet, it is obvious that reducing the jet diameter will increase the velocity of the jet, thus holding the total flow per jet constant. A reduction in jet diameter will produce a twofold effect since there will be a reduction both in the absolute length of the critical zone of the jet (i.e. up to 8 jet diameters) and the time that the olefins remain in this critical zone. This twofold effect will markedly reduce the conversion of olefins to undesired products as shown in Table II. Here, again, the calculations were made on the same basis as that for Table I with the exception that the olefin jet diameter was varied inversely with respect to the jet velocity.

TABLE II

*Effect of Varying Jet Diameter at Constant Volume of Flow per Jet*

| Jet Diameter, inches | 0.141 | 0.10 | 0.071 | 0.05 | 0.035 | 0.025 |
|---|---|---|---|---|---|---|
| Jet Velocity, Ft./Sec. | 3.75 | 7.5 | 15 | 30 | 60 | 120 |
| Percent of Olefins Converted | 14.07 | 4.99 | 1.71 | 0.597 | 0.212 | 0.0755 |

By plotting the information of Tables I and II in terms of jet velocity versus the percent of olefin feed converted, it will be seen that for minimum conversion of olefins to undesired products, the jet velocity should be no less than about 50, preferably no less than 60 feet per second. Preferably, velocities as high as 120 to 240 feet per second should be used.

Assuming now a constant jet velocity of 60 feet per second, it will be observed that if the jet diameter at that constant velocity is reduced, the undesired conversion of olefins in the jet will be decreased. This is shown in Table III where, again, the same conditions were assumed as in that of Tables I and II with the exception, of course, that the jet velocity was constant at 60 feet per second and the jet diameter was varied. The information in Table III clearly point to the desirability of using the smallest jets that can be fabricated consistent with a provision for means to prevent plugging of jet nozzles.

TABLE III

*Effect of Varying Jet Diameter*

[Velocity constant at 60 ft./sec.]

| Jet Diameter, inches | 0.013 | 0.025 | 0.05 | 0.10 | 0.20 |
|---|---|---|---|---|---|
| Percent Olefin converted to Undesired Products | 0.068 | 0.136 | 0.298 | 0.596 | 1.192 |

For a plant for alkylating isobutane with butylenes, assuming an ideal product quality of about 99.3 ASTM octane number, the olefin conversion in the jet to undesired alkylate has a marked effect on the final product quality. Even at the 96.5 octane level, the effect is important. Calculated data for various percentages of olefin conversion to undesired products at the different octane levels are presented in Table IV.

TABLE IV

*Effect of Jet Conversion on Product Quality*

| Percent Olefins Converted in 8 Jet Diameters (Calc.) | 0.25 | 0.5 | 1.0 |
|---|---|---|---|
| Loss in Octane Number (ASTM Motor) at: | | | |
| 99.3 Level | 1.20 | 1.70 | 2.30 |
| 96.5 Level | 0.15 | 0.30 | 0.50 |

Since it is desirable to keep the loss in octane number at a minimum and preferably below about 1.5, it follows from interpolation of the data in Table IV that the percent olefins converted to undesired alkylate should be no higher than about 0.4 percent. Interpolating the information in Table III on this basis indicates that the maximum jet diameter should preferably be no greater than about 0.05 inch.

When injecting olefin into acid hydrocarbon reaction emulsions through simple orifice openings, it was found that the acid tended to back up into the headers causing corrosion of the header and eventual failure. To obtain the desired efficiency of mixing needed to obtain high quality alkylate over a prolonged period of time, corrosion would have to be eliminated as it increases the size of the orifice and reduces the velocity of the olefin feed, at a constant volumetric feed rate per orifice. Applicant unexpectedly found that if the olefin was injected into the reactor through olefin jet nozzles at velocities of at least about 50 ft./sec. and, preferably, at least 60 ft./sec. through jet nozzles having a maximum inside diameter of no more than about 0.05 inch, and preferably no more than .035 inch, corrosion of the jet nozzles did not occur. Generally, the velocity required to prevent corrosion increases directly with jet diameter and to some extent increases in velocity can compensate for increases in diameter and likewise decreases in diameter can compensate for decreases in velocity. It was unexpectedly found that the use of higher velocity throughputs of olefin feed and smaller diameter jet nozzles resulted in less corrosion occurring. Thus for a jet nozzle of a given diameter, the higher the velocity, the less the corrosion.

In order to demonstrate this unexpected effect, various olefin inlet means were removed from in-service sulfuric catalyzed alkylation reactors and compared. The results of the comparison are given below in Table V:

TABLE V [3]

| Velocity | Orig. Dia. | Final Dia. | Time in Use, months | Ratio of Final Dia./Orig. |
|---|---|---|---|---|
| 1. 60 Ft./Sec. [1] | .032 | .032 | 18 | 1.0 |
| 2. 30 Ft./Sec. | .078 | .13 | 18–24 | 1.66 |
| 3. 30 Ft./Sec. [2] | .0935 | .34 | 18–24 | 3.67 |
| 4. 30 Ft./Sec. | .118 | .31 | 18 | 2.63 |

[1] The material used to make this nozzle was tungsten carbide vice Hastelloy B steel alloy which was used in II, III and IV. Tungsten carbide was used because it could more easily be made into the desired shape and nozzle diameters than Hastelloy B. The two materials have a slightly different corrosion rate. The static corrosion at 200° F. in a 96% sulfuric acid concentration for the tungsten carbide is .002 inch per year and for the Hastelloy B .004 inch per year.

[2] In this instance, a simple orifice was used instead of a nozzle.

[3] The difference in corrosion rate between tungsten carbide and Hastelloy B under these conditions is negligible as compared to the effect on corrosion of the jet diameters.

In Table V above, nozzle (1) is an example of this invention. From the data presented, it is obvious that after 18 months of operation, the olefin inlet jet nozzle (1) experienced no corrosion. Numerals (2) and (4) represent jet nozzles having nozzle diameters greater (i.e. .078 and .0935) than applicant's critical diameter of about 0.05 inch which were operated at inlet velocities of 30 ft./sec. vice applicant's minimum velocities of about 50 ft./sec. It is further noted that the simple orifice (3) exhibited a considerably greater amount of corrosion than the nozzles (2) and (4).

As noted previously, although the precautions enumerated above do enhance the quality of the alkylate appreciably and prevent corrosion of the olefin inlet jet nozzle, a difficulty arises because of the tendency for the jet nozzles to plug under certain operating conditions due to vaporization of olefin in the nozzle and deposition of small solid particles in the bore of the nozzle. To prevent this, it is necessary in accordance with an embodiment of the present invention to provide an injection nozzle in which the normal friction loss in the straight run portion of the bore of the nozzle provides a pressure drop that is equivalent to at least 1.28 velocity heads. Then, if the feed is initially cooled down to or below its bubble point at the reactor presure, vaporization of feed will not occur in the jet and plugging will not occur.

Figure 6:
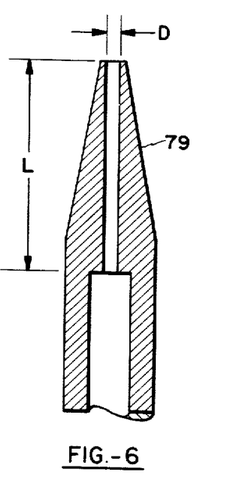
FIGURE 6 is a sectional fragmentary view of one form of injection nozzle that embodies the novel features of the present invention.

Referring now to FIGURE 6, a nozzle 79 with a bore diameter D, should have a bore length L that is at least as great as is set forth in Table VI, below, in order to provide the necessary pressure drop. This will insure that the injected olefin feed will remain in the liquid state at all times in the nozzle. The values given are typical values for representative injection nozzles and may vary somewhat depending on the degree of smoothness of the nozzle bore.

TABLE VI

| Velocity, Ft./Sec. | Min. Jet Length—Number of Jet Diameters | |
|---|---|---|
| | .0312 inch | .05 inch |
| 50 | 47.5 | 53.0 |
| 100 | 53.9 | 61.0 |
| 150 | 61.2 | 64.0 |
| 200 | 62.5 | 67.0 |
| 250 | 64.0 | 70.0 |

Figure 7:
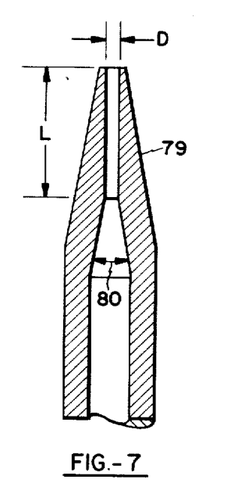
FIGURE 7 is a sectional view of a preferred form of nozzle to be employed in the present invention.
Figure 8:
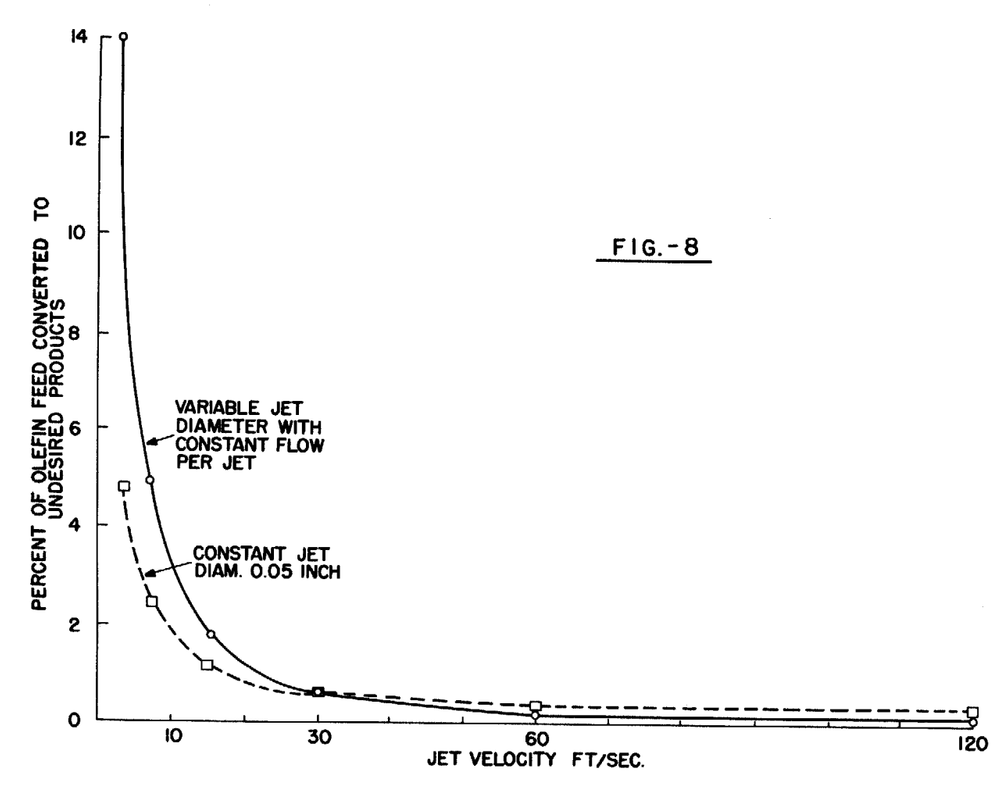
FIGURE 8 is a graphical representation of the effect of olefin jet velocity on the conversion of olefins to undesired products in an acid catalyzed alkylation reaction.

As an additional safety factor to help prevent vaporization, it is preferred that the entrance to the straight run portion of the nozzle bore be streamlined so as to provide a gradual increase in velocity within the nozzle. It was found that the minimum jet length stipulated herein can be somewhat reduced to the order of about 20 diameters providing the jet entrance is streamlined. This can be accomplished by shaping the jet entrance so that the velocity is gradually increased from about 10 ft./sec. at the entrance by use of a smooth, tapered throat whose total cone angle is in the order of 25–30° or less. This addition not only prevents vaporization but will tend to reduce the permanent entrance loss from the order of .5 velocity heads to about .05 velocity heads. Thus, as shown in FIGURE 7, the nozzle entrance is preferably in the form of a streamlined tapered throat 80 whose total cone angle is in the order of 25 to 30°. Other type streamlined entrances can also be employed.

As a matter of safety in design, it is preferred to incorporate this tapered entrance flow while still designing the straight run portion of the jet in accordance with the first principles described herein. My reason for adhering to this design principle is based on the fact that a small amount of solid material can collect in the tapered cone entrance, thereby resulting in the same disastrous effect as previously described in the case of a nontapered entrance.

It is an additional feature of the present invention to reduce olefin degradation still further by precooling the olefin prior to its injection into the emulsion of hydrocarbon and acid in catalyst. In fact, one of the most significant factors controlling the conversion of olefins to undesired products is the temperature of the olefin feed jet. This effect is shown in Table VII. The conditions assumed for this are that 96% strength sulfuric acid was employed with 60% acid, 60% isobutane present in the reaction product, and 40% hydrocarbons in the reaction emulsion.

TABLE VII

| Average Olefin Jet Tmp., °F. | 20 | 30 | 45 | 50 |
|---|---|---|---|---|
| Percent Olefins Converted to Undesired Products in the Jet | 0.002 | 0.043 | 2.39 | 9.48 |

The temperatures in Table VII are the integrated average temperatures throughout the life of the jet nozzle. The desirability of cooling the olefin stream at least to 30° F. and preferably below 20° F. is readily evident.

Although it is important to keep the temperature of the olefin jet below about 30° F., optimum overall nominal reactor temperature for isoparaffin alkylation with sulfuric acid catalyst is in the range of from 40 to 60° F. It is, therefore, within the contemplation of this invention preferably to conduct the alkylation reaction in the latter range of 40 to 60° F., while maintaining the temperature of the olefin jets in the range of from −20° to +30° F.

If the straight run portion of the jet is sufficiently short and the vena contracta from the entrance falls outside of the length of the straight run portion of the jet, then it is possible to obtain extremely cold feed at the point of contact with the catalyst. It is also possible to obtain ultimate vaporization approaching 100% vapor outside the jet nozzle even though the initial feed was all liquid. Under these conditions, extremely low temperatures below −200° F. can be obtained, on this vapor and liquid stream. Gaseous velocities are exceremly high and kinetic energy imparted to the jet stream beyond the jet nozzle create considerable turbulence, several-fold of that obtained with the straight liquid injection. In addition, pressure drop losses through this jet nozzle are relatively small.

In accordance with the present invention, olefin jet nozzles having an inside diameter of about 0.010 to about 0.050 inch can be used though nozzles of 0.020 to 0.035 inch are preferred. Jet velocities of about 50 to about 250 ft./sec. can be used though velocities of 60 to 200 ft./sec. are preferred. The straight run bore length can vary from 2 or 3 times the diameter of the jet up to 100 times the diameter of the jet, depending on diameters and velocities and on whether or not the throat entrance to the straight run portion of the bore is tapered. The total cone angle of the tapered bore can be 25 to 30° or less, for example, 5 to 15°.

In still another embodiment of this invention, undesired side reactions are minimized by keeping the olefin content of the feed at least below 10 percent olefins and preferably below about 5 percent. This limitation is based on the observation that there is an inter-relationship between the maximum temperature in the olefin jet and the olefin content of the feed.

For reactor temperatures of from 40 to 60° F., it is preferred that the olefin feed temperature should not exceed 35° F. Furthermore, for olefin concentrations greater than 5 percent in the olefin feed, in the case of butene-1 or butene-2, the temperature should be no greater than that determined by the formula $T_F = 71 - 7.2 \times$ (percent olefins in feed). Thus for 7 percent butenes in the feed, the maximum desirable temperature for the olefin feed is about 20° F. and for 10 percent olefins, it is about 0° F.

Since isobutylene is many times more reactive than either butene-1 or butene-2, still lower feed temperatures are desirable to minimize side reactions if appreciable proportions of isobutylene are present in the feed. If the olefin feed is substantially pure isobutylene, it is desirable to employ a maximum reaction temperature in the jet no greater than 40° F. and to keep the temperature of the olefin jet below the maximum defined by the formula $T_F=T_R-11.9\times$ (percent olefins in feed); where $T_F$ is the feed temperature, $T_R$ is the reaction temperature and the catalyst is strong sulfuric acid. Preferably for isobutylene feed where the maximum desired reaction temperature is 40° F., $T_F=40-11.9\times$ (percent olefins in feed). Thus, for mixed butane feeds, $T_F$ can be between $T_F=40-11.9\times$ (percent olefins in feed) to $$T_F=71-7.2\times$$

(percent olefins in feed).

To minimize undesirable side reactions, an ideal set of reaction conditions for the alkylation of isobutane with a mixed butene feed using sulfuric acid catalyst includes a reactor temperature of 55 to 60° F., an olefin feed temperature of 0° F., no more than 5 percent olefins in the olefin feed, an olefin jet diameter of about 0.02 inch and an olefin jet velocity of about 240 feet per second.

In an alkylation system in which multi-staged olefin injection is employed with two or more reaction zones in series, the maximum average isobutane concentration is obtained when both the entire recycle isobutane and the compressor condensate from the autorefrigerated reactors are fed into the lead stage. However, when this is practiced, there is an acid gradient in the reactors, there being a smaller amount of acid catalyst inventory in the lead reactor stages than in the terminal stages. The exact acid inventory in any stage is fixed by the amount of acid recycle from the acid settler to the lead stage. For a given reactor, product quality, and composition, the settler capacity required is determined by the recycle acid rate which, in turn, controls the acid inventory in the last stage. With these items fixed, heat and material balances control the inventory in the remaining zones of the reactor.

The absolute maximum product quality attainable with a perfect olefin jet system is basically controlled by the integrated intensity factor $$\frac{R_o}{V_a\left(\dfrac{iC_4}{100}\right)^2}$$

where $R_o$ is the olefin feed rate to each stage, $V_a$ is the acid inventory in each stage and $iC_4$ is the percent isobutane concentration in the hydrocarbon phase in each stage. The lower the value of this factor, the higher will be the product quality.

By premixing part of the recycle isobutane streams with olefins in accordance with the present invention to dilute the feed olefin concentration, the isobutane concentration is reduced somewhat in the lead stages, but is always substantially the same in the last stage. This procedure increases the acid inventory in the lead stages, which more than compensates the quality loss that would result from the lower isobutane concentration in the lead stages. Therefore, for optimum design, recycle isobutane premixing is limited to that amount which will give about the same acid inventory in each stage. This amount of premixing may be determined by appropriate calculations.

Although the principles of this invention have been illustrated largely by reference to the alkylation of isobutane with butylene in the presence of sulfuric acid, it is not intended that the invention be limited thereto. It is also intended that it include other isoparaffins such as isopentane as well as other olefins, such as ethylene, propylene, amylenes and hexenes. The invention also contemplates the use of other suitable liquid catalysts in place of sulfuric acid, such as phosphoric acid, mixtures of sulfuric and phosphoric acid, fluorosulfonic acid, and hydrofluoric acid. Other suitable catalysts are sludges, such as aluminum chloride and slurry catalyst, such as $H_3PO_4$ on silica. These principles are applicable in reactions where the reactants are volatile and where fast rate competitive reactions are encountered.

Also, although reference has generally been made to dilution of the olefin feed with isoparaffins, it is likewise possible to employ normal paraffins for this purpose; for example, caustic-washed normal butanes or a portion of the reactor product. From a practical standpoint, what have been referred to as fresh isobutane and recycle isobutane will usually contain some normal butane as well. Therefore, in the claims when reference is made to dilution of the olefins with isoparaffins, what is meant is either isoparaffins as such, or mixtures of isoparaffins and normal paraffins.

This application is a continuation-in-part of applications Serial No. 706,848, filed January 2, 1958, and Serial No. 3,095, filed January 18, 1960, both of which applications are now abandoned.

What is claimed is:

1. In the alkylation of isoparaffin hydrocarbons with olefin hydrocarbons in the presence of a concentrated liquid acid catalyst, wherein the olefin hydrocarbons entering into the reaction are introduced into a turbulent emulsion comprising said isoparaffin hydrocarbons, acid catalyst and reaction products, the improvement which comprises injecting the olefin feed into said emulsion in the form of a plurality of jets having diameters in the range of from 0.01 to 0.035 inch and jet velocities of at least 60 feet per second.

2. The process as defined by claim 1 wherein said injected olefin feed comprises olefin admixed with sufficient isoparaffin to dilute the olefin concentration so that it is no greater than about 10 percent.

3. The process as defined by claim 1 wherein said reaction is conducted at temperatures in the range of about 40 to 60° F. and the temperature of said olefin feed injected through said jets is no greater than 35° F.

4. The process as defined by claim 1 wherein the olefin feed temperature ($T_F$) is no greater than that determined by the formula $T_F=71-7.2\times$(percent olefin in feed), the temperature being in degrees Fahrenheit.

5. The process as defined by claim 1 wherein the olefin feed temperature, $T_F$, is between $T_F=71-71.2\times$(percent olefin in feed) and $T_F=40-11.9\times$(percent olefin in feed), the temperature being in degrees Fahrenheit.

6. The process as defined by claim 1 wherein said reaction is conducted at temperatures in the range of about 40 to 60° F. and the temperature of said olefin jets is in the range of $-20°$ to $+20°$ F.

7. Process as defined by claim 1 wherein said reaction comprises the alkylation of isobutane with butylene in the presence of concentrated sulfuric acid.

8. Process as defined by claim 1 wherein said jets are produced by passage of said olefin feed through nozzles having bores with diameters within the defined range and with effective bore lengths greater than 20 diameters.

9. The process of claim 7 wherein said bore has a minimum length of one inch.

10. In the alkylation of isobutane with butenes in the presence of concentrated sulfuric acid catalyst wherein the butenes entering into the reaction are introduced into a turbulent emulsion comprising said isobutane, acid catalyst and reaction products the improvement which comprises injecting the butenes into said emulsion in the form of jets having diameters of about 0.02 to 0.035 inch at velocities of about 100 to 240 feet per second, said butenes entering said jets being admixed with sufficient isobutane to dilute the olefin concentration so that it is no greater than about 5 percent, the reaction temperature being maintained at 55 to 60° F. and the olefin feed temperature being maintained at about $-20$ to $+20°$ F.

11. In the alkylation of isoparaffin hydrocarbons with olefin hydrocarbons in the presence of a concentrated liquid acid catalyst wherein the olefin hydrocarbons entering into the reaction are introduced into a turbulent emulsion comprising said isoparaffin hydrocarbons, acid catalyst and reaction products, the improvement which comprises injecting the olefin feed into said emulsion in the form of jets having diameters in the range of from 0.010 to 0.035 inch and jet velocities of at least 60 feet per second, wherein said jets are produced by passage of said olefin feed through nozzles having bores with diameters within the defined range and with effective bore lengths greater than 20 diameters with a minimum bore length of 1 inch.

12. In the alkylation of isoparaffin hydrocarbons with olefin hydrocarbons in the presence of a concentrated liquid acid catalyst, wherein the olefin hydrocarbons entering into the reaction are introduced into a turbulent emulsion comprising said isoparaffin hydrocarbons, acid catalyst and reaction products, the improvement which comprises conducting the alkylation reaction at a temperature in the range of about 40 to 60° F., injecting the olefin feed into said emulsion through jet nozzles having bores with diameters in the range of from 0.01 to 0.035 inch and with effective bore lengths greater than 20 diameters, with a minimum bore length of 1 inch at jet velocities of at least 60 feet per second wherein the olefin injection temperature ($T_F$) is between that determined by the formula $T_F = 71 - 7.2 \times$ (percent olefin in feed to jets), and $T_F = 40 - 11.9 \times$ (percent olefin in feed), the temperature being in degrees Fahrenheit.

13. In the alkylation of isoparaffin hydrocarbons with olefin hydrocarbons in the presence of an acid catalyst, wherein the olefin hydrocarbons entering into the reactions are introduced into a turbulent mixture comprising isoparaffinic hydrocarbons and acid catalyst, the improvement which comprises injecting the olefin feed into said mixture in the form of a plurality of jets having diameters in the range of from about 0.01 to about 0.05 inch and at jet velocities of from 50 to 250 feet per second, said jets being formed by passage of said feed through essentially straight line passageways having diameters within the aforesaid range and having lengths sufficient to provide a pressure drop through the straight line portion of at least 1.28 velocity heads.

14. Process as defined by claim 13 wherein said passageways have lengths in the range of about 47.5 to 64 diameters for a jet diameter of about 0.03 inch.

15. Process as defined by claim 13 wherein said passageways have a diameter of about 0.05 inch and lengths in the range of about 53 to 70 diameters.

16. The process as defined by claim 13 wherein said straight line passageways have a tapered throat entrance having a total cone angle of 25 to 30 degrees through which the olefin passes when being introduced in the reaction zone.

17. In the alkylation of isoparaffin hydrocarbons with olefin hydrocarbons in the presence of an acid catalyst, wherein the olefin hydrocarbons entering into the reaction are introduced into a turbulent mixture comprising isoparaffinic hydrocarbons and acid catalyst, the improvement which consists in injecting the olefin feed into said mixture in the form of a plurality of jets having diametres in the range of from about 0.03 to about 0.05 inch and at velocities of from 50 to 250 feet per second, said jets being formed by passage of said feed through essentially straight line passageways having diameters within the aforesaid range and having lengths of about 47.5 to 70 times the diameters.

18. In the alkylation of isoparaffin hydrocarbons with olefin hydrocarbons in the presence of an acid catalyst, wherein the olefin hydrocarbons entering into the reaction are introduced into a turbulent mixture comprising isoparaffinic hydrocarbons and acid catalyst, the improvement which comprises injecting the olefin feed into said mixture in the form of a plurality of jets having diameters in the range of from about 0.01 to about 0.05 inch and at jet velocities of from 50 to 250 feet per second, said jets being formed by passage of said feed through jet nozzles.

19. The process as defined by claim 18 wherein said jet nozzles have a tapered throat entrance having a total cone angle of 25 to 30° through which the olefin passes when being introduced into the reaction zone.

20. In the alkylation of isoparaffin hydrocarbons with olefin hydrocarbons in the presence of an acid catalyst, wherein the olefin hydrocarbons entering into the reaction are introduced into a turbulent mixture comprising isoparaffinic hydrocarbons and acid catalyst, the improvement which comprises injecting the olefin feed into said mixture in the form of a plurality of olefin feed jets having diameters in the range of from about 0.02 to about 0.035 inch and at jet velocities of from 60 to 200 feet per second, said jets being formed by passage of said feed through jet nozzles.

21. In the alkylation of isoparaffin hydrocarbons with olefin hydrocarbons in the presence of a concentrated liquid acid catalyst, wherein the olefin hydrocarbons entering into the reaction are introduced into a turbulent emulsion comprising said isoparaffin hydrocarbons, acid catalyst and reaction products, the improvement of which comprises injecting the olefin feed through jet nozzles into said emulsion in the form of jets having diameters in the range of from 0.01 to 0.050 inch and jet velocities of at least 50 feet per second, wherein the olefin feed is introduced at a temperature below its bubble point at the reactor pressure.

22. In the alkylation of isoparaffin hydrocarbons with olefin hydrocarbons in the presence of a concentrated liquid acid catalyst, wherein the olefin hydrocarbons entering into the reaction are introduced into a turbulent emulsion comprising said isoparaffin hydrocarbons, acid catalyst and reaction products, the improvement of which comprises injecting the olefin feed through jet nozzles into said emulsion in the form of jets having diameters in the range of from 0.01 to 0.050 inch and jet velocities of at least 50 feet per second, said jets being formed by passage of said feed through essentially straight line passageways, said straight line passageways having a tapered throat entrance of a total cone angle of less than about 30°.

References Cited in the file of this patent

UNITED STATES PATENTS

| | | |
|---|---|---|
| 2,438,852 | Goldsby et al. | Mar. 30, 1948 |
| 2,454,869 | Goldsby et al. | Nov. 30, 1948 |
| 2,664,452 | Putney | Dec. 29, 1953 |
| 2,751,425 | Rupp | June 19, 1956 |
| 2,829,181 | Stiles et al. | Apr. 1, 1958 |
| 2,920,124 | Stiles et al. | Jan. 3, 1960 |

FOREIGN PATENTS

| | | |
|---|---|---|
| 803,458 | Great Britain | Oct. 22, 1958 |

UNITED STATES PATENT OFFICE

CERTIFICATE OF CORRECTION

Patent No. 3,109,042　　　　　　　　　　　　October 29, 1963

Ivan Mayer

It is hereby certified that error appears in the above numbered patent requiring correction and that the said Letters Patent should read as corrected below.

Column 12, line 38, for "$T_F=71-71.2x$" read -- $T_F=71-7.2x$ --.

Signed and sealed this 5th day of May 1964.

(SEAL)
Attest:
ERNEST W. SWIDER

Attesting Officer

EDWARD J. BRENNER
Commissioner of Patents